(12) United States Patent
Nainar et al.

(10) Patent No.: US 10,454,822 B2
(45) Date of Patent: Oct. 22, 2019

(54) FULL-PATH VALIDATION IN SEGMENT ROUTING

(71) Applicant: Cisco Technology, Inc., San Jose, CA (US)

(72) Inventors: Nagendra Kumar Nainar, Morrisville, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 15/661,540

(22) Filed: Jul. 27, 2017

(65) Prior Publication Data
US 2019/0036818 A1   Jan. 31, 2019

(51) Int. Cl.
*H04L 12/741* (2013.01)
*H04L 29/06* (2006.01)
*H04L 29/08* (2006.01)

(52) U.S. Cl.
CPC .............. *H04L 45/74* (2013.01); *H04L 69/22* (2013.01); *H04L 69/325* (2013.01)

(58) Field of Classification Search
CPC ................................ H04L 45/74; H04L 69/22
See application file for complete search history.

(56) References Cited

U.S. PATENT DOCUMENTS

| | | | |
|---|---|---|---|
| 2011/0063973 A1* | 3/2011 | VenkataRaman ... | H04L 12/1877 370/228 |
| 2011/0164501 A1* | 7/2011 | Dunbar ............... | H04L 43/0805 370/236.2 |
| 2018/0198705 A1* | 7/2018 | Wang .................... | H04L 45/306 |

OTHER PUBLICATIONS

Fisfils et al. "SRv6 Network Programming draft-filsfils-spring-srv6-network-programming-00" SPRING; Internet-Draft; Mar. 9, 2017; pp. 1-41.
Previdi et al. "IPv6 Segment Routing Header (SRH) draft-ietf-6man-segment-routing-header-02" Network Working Group; Sep. 20, 2016; pp. 1-29.
Previdi et al. "IPv6 Segment Routing Header (SRH) draft-ietf-6man-segment-routing-header-07" Network Working Group; Jul. 20, 2017, pp. 1-34.
Previdi et al. "Segment Routing Prefix SID extensions for BGP draft-ietf-idr-bgp-prefix-sid-04" IDR; Dec. 12, 2016; pp. 1-16.
Quinn et al. "Network Service Header draft-quinn-sfc-nsh-03.txt" Network Working Group; Jul. 3, 2014; pp. 1-27.

(Continued)

*Primary Examiner* — Derrick W Ferris
*Assistant Examiner* — Farhad Ali
(74) *Attorney, Agent, or Firm* — Behmke Innovation Group LLC; James M. Behmke; Stephen D. LeBarron

(57) ABSTRACT

In one embodiment, a device in a network identifies a packet to be sent to a destination in the network via a path using segment routing. The device determines a list of one or more unique identifiers for one or more of the nodes along the path. The device includes a segment routing header with the packet, the segment routing header comprising a set of segment identifiers and the list of one or more unique identifiers. The device sends the packet with the segment routing header towards the destination in the network. One or more receiving nodes that receive the packet use the set of segment identifiers to route the packet towards the destination and the list of one or more unique identifiers to notify the device when the packet was not sent to the destination via the path.

17 Claims, 13 Drawing Sheets

(56) References Cited

OTHER PUBLICATIONS

How Segment Routing Works; Introduction to Segment Routing; Segment Routing Configuration Guide, Cisco IOS XE Release 3S; pp. 1-8.
Katz et al. "Bidirectional Forwarding Detection (BFD)" Internet Engineering Task Force (IETF); Jun. 2010; pp. 1-49.
Halpern et al. "Service Function Chaining (SFC) Architecture" Internet Engineering Task Force (IETF); Oct. 2015; pp. 1-32.
Ginsberg et al. "Advertising Seamless Bidirectional Forwarding Detection S-BFD Discriminators in IS-IS" Jul. 2016; pp. 1-5.
Akiya et al. "Seamless Bidirectional Forwarding Detection(BFD) for Segment Routing (SR) draft-akiya-bfd-seamless-sr-00" Internet Engineering Task Force; Jun. 7, 2013; pp. 1-4.

* cited by examiner

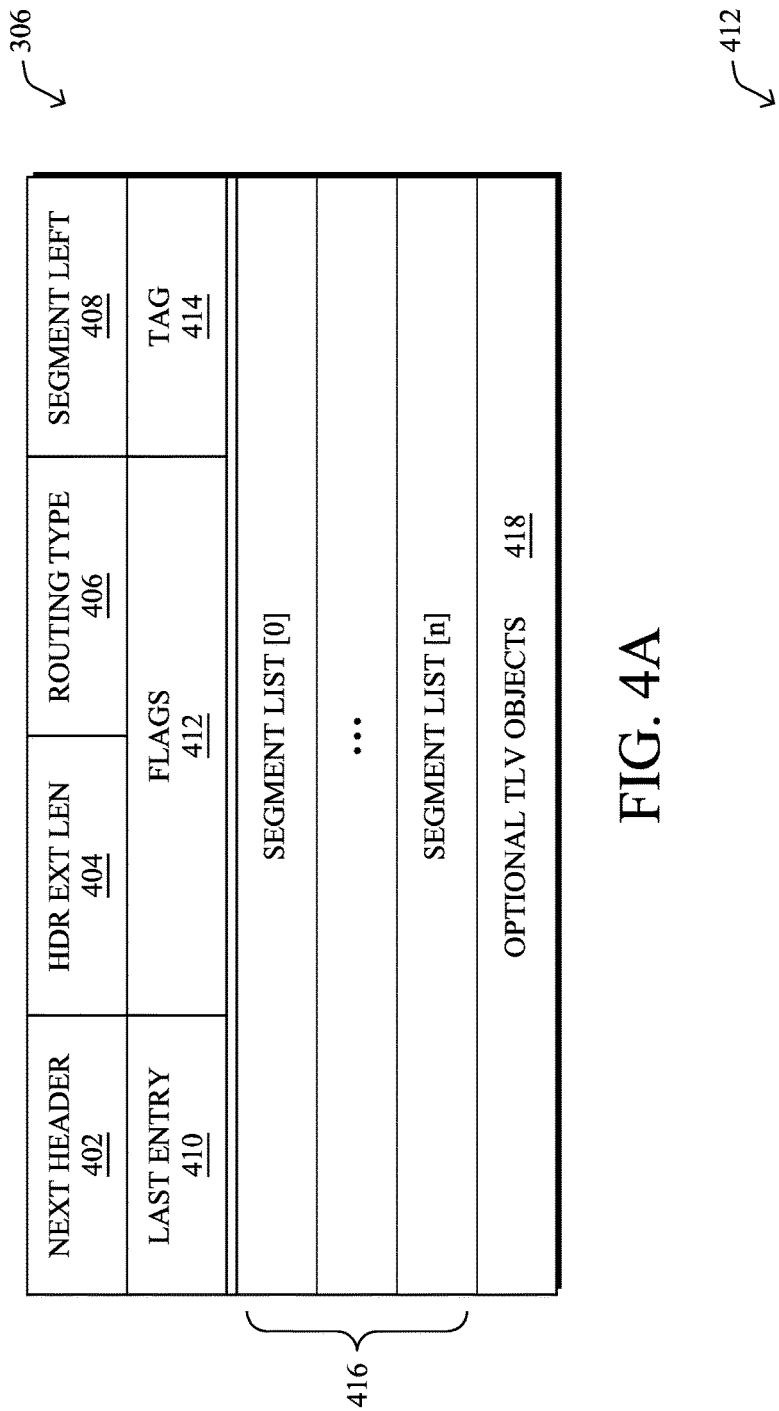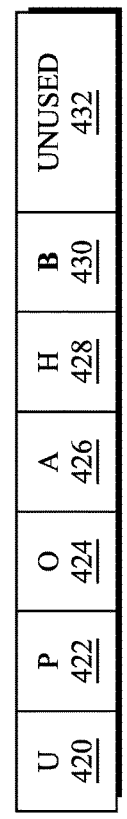
FIG. 4A
FIG. 4B

FULL-PATH VALIDATION IN SEGMENT ROUTING

TECHNICAL FIELD

The present disclosure relates generally to computer networks, and, more particularly, to full-path validation in segment routing.

BACKGROUND

Segment routing is a routing technology that may be used in conjunction with either a Multiprotocol Label Switching (MPLS) or Internet Protocol version 6 (IPv6) dataplane. Generally, segment routing operates by using "segments" to represent sub-paths in the network as segment identifiers (IDs). Thus, to route a packet from one point in the network to another, the source router may select a set of segment IDs that can then be used to transmit the packet towards the destination. However, there are a number of situations that can cause the packet to be routed over a different path than the one instructed.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4C illustrate examples of a segment routing header;

DESCRIPTION OF EXAMPLE EMBODIMENTS

Overview

According to one or more embodiments of the disclosure, a device in a network identifies a packet to be sent to a destination in the network via a path using segment routing. The device determines a list of one or more unique identifiers for one or more of the nodes along the path. The device includes a segment routing header with the packet, the segment routing header comprising a set of segment identifiers and the list of one or more unique identifiers. The device sends the packet with the segment routing header towards the destination in the network. One or more receiving nodes that receive the packet use the set of segment identifiers to route the packet towards the destination and the list of one or more unique identifiers to notify the device when the packet was not sent to the destination via the path.

In further embodiments, a node in a network receives a packet that includes a segment routing header that comprises a set of segment identifiers and a list of one or more unique identifiers for one or more nodes along a path from a sender of the packet to a destination in the network. The node identifies the list of one or more unique identifiers from the segment routing header of the packet. The node determines that the packet was not sent via the path based in part on the identified list of one or more unique identifiers from the segment routing header of the packet. The node notifies the sender of the packet in the network that the packet was not sent to the destination via the path.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
FIG. 1 illustrates an example communication network.
Figure 1:
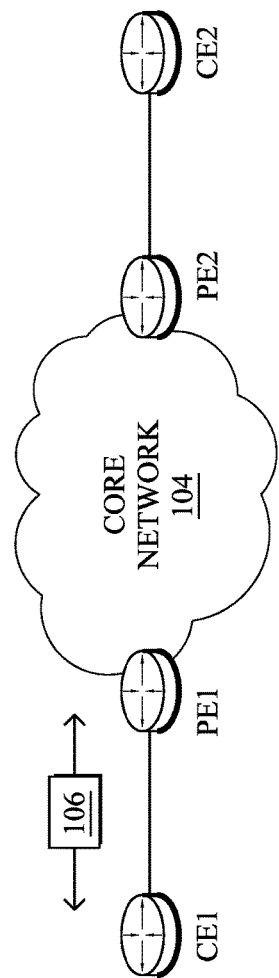

FIG. 1 is a schematic block diagram of an example computer network 100 illustratively comprising nodes/devices 200, such as a plurality of routers/devices interconnected by links or networks, as shown. For example, customer edge (CE) routers (e.g., CE1 and CE2) may be interconnected with provider edge (PE) routers (e.g., PE1 and PE2, respectively), to communicate across a core network, such as an illustrative core network 104. Core network 104 may be a Multi-Protocol Label Switching (MPLS) network, an Internet Protocol (IP) network or, alternatively, any other form of network.

Data packets 106 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 2:
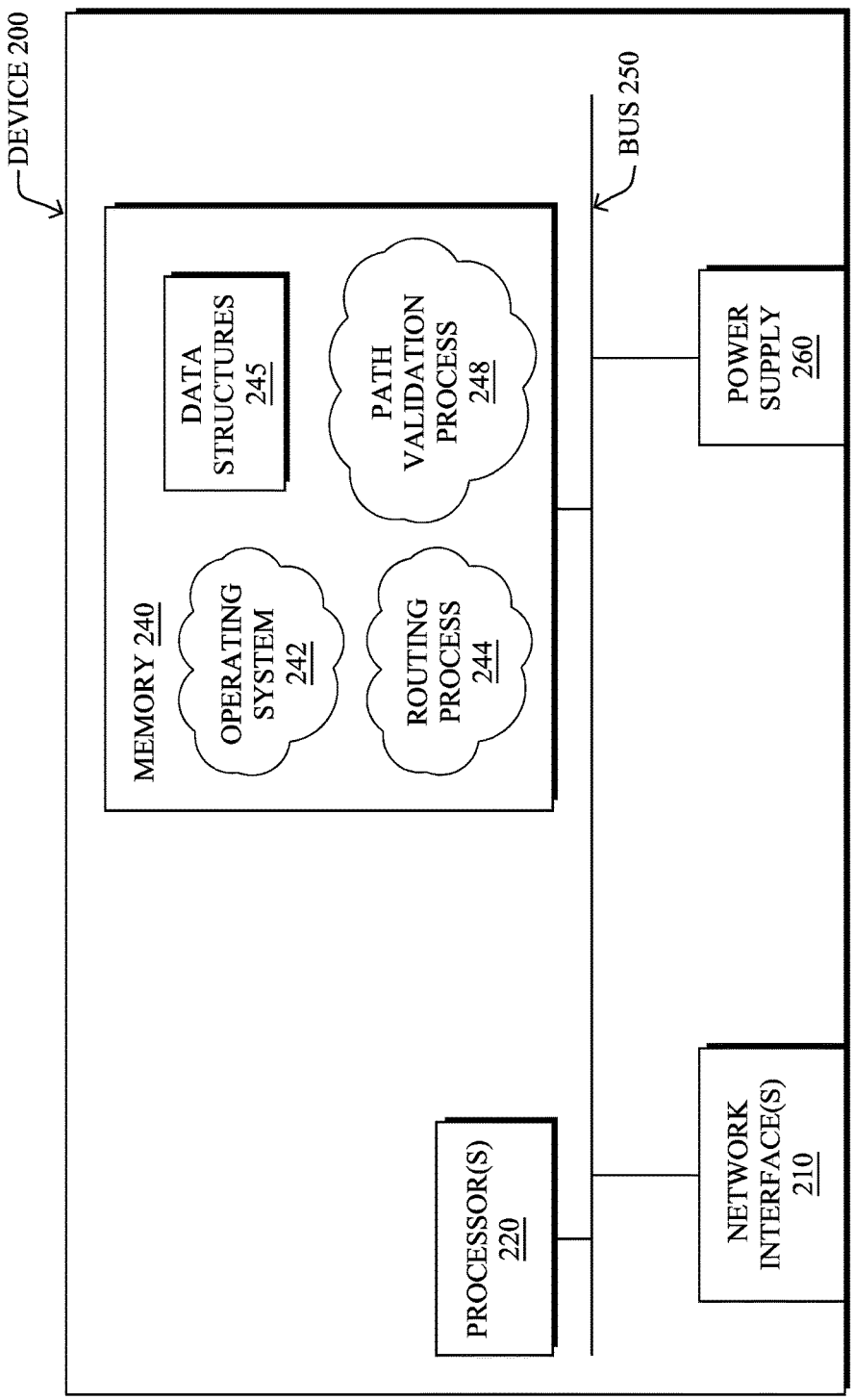
FIG. 2 illustrates an example network device/node.

FIG. 2 is a schematic block diagram of an example node/device 200 that may be used with one or more embodiments described herein, e.g., as any of the routers of network 100, or any other computing device that supports the operations of network 100 (e.g., switches, servers, etc.). Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may include a routing process 244 and/or a path validation process 248, as described herein, any of which may alternatively be located within individual network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP) (e.g., in conjunction with process 248), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

In various embodiments, routing process 244 may be configured to perform segment routing in the network, such as, e.g., in conjunction with an MPLS or IP-based network backbone. For example, routing process 244 may utilize extensions to the IGP (e.g., IS-IS, OSPF, etc.), that allow IGP messages to carry MPLS label information, to enable segment routing (MPLS-SR). In another example, routing process 244 may utilize a segment routing extension header (SRH) to carry segment routing information in a packet sent via an IP-based network, such as an IP version 6 (IPv6) network.

Generally, segments in a segment routed network may fall into one of two categories: node segments and adjacency segments. In particular, adjacency segments represent the local interface between a given device/node and an adjacent neighbor. Adjacency segments also do not need to be unique among the different nodes, as adjacency segments only require local significance to the particular node processing the packet. Node segments, in contrast, are global in nature and use globally-unique identifiers in the network to represent node segment endpoints.

Segments in segment routing are represented as segment identifiers (SIDs), which fall into two categories:

1.) Prefix SIDs—globally unique IDs that include an IP address prefix calculated by an IGP in the network. A sub-type of prefix SID is a node SID that represents a node segment and includes a loopback address of the node.

2.) Adjacency SIDs—SIDs that represents an adjacency link between an advertising router and a neighbor. Since this adjacency is of significance to a specific router, such as a specific interface to a neighboring router, it need only be locally unique and not globally unique within the network, as in the case of prefix SIDs.

In further embodiments, routing process 244 may be operable to implement the Service Function Chaining (SFC) architecture. Details regarding the SFC architecture can be found in the Internet Engineering Task Force (IETF) request for comments (RFC) entitled, "Service Function Chaining (SFC) Architecture" by J. Halpern, et al. In general, SFC facilitates the use of network services and provides for network location techniques to locate the device(s) that support these services. Example services may include, but are not limited to, caching services, firewall services, anti-intrusion services, malware detection services, deep packet inspection (DPI) services, acceleration services, load balancing services, lawful intercept (LI) services, optimization services, etc. In particular, a service function chain comprises an ordered set of services that may be provided to network traffic based on the classification of the traffic.

As part of the SFC architecture, a service function path (SFP) may be defined that indicates to which services a certain packet must be sent (e.g., which services are to perform their respective functions on the packet). The packet/frame may then be encapsulated, to include an indication of the SFP. Of note is that SFC encapsulation is used solely to include data plane context information and is not used for purposes of network packet forwarding. In particular, a network service header (NSH) may be added to a packet or frame, to convey metadata and service path information that may be used to create the service plane. For transport, the NSH and packet may be encapsulated in an outer header. Details regarding an NSH protocol header can be found in the IETF RFC draft entitled, "Network Service Header," by P. Quinn, et al.

As noted above, segment routing is equally applicable in both MPLS and IP-based data planes and uses a set of SIDs to steer a packet over a certain path in the network. Such a path is typically either a service level agreement (SLA)-constrained path for traffic engineering (TE) applications or the result of a network service selection mechanism, as in the case of SFCs. However, there are various situations that may result in a packet flowing over a different path than the path instructed using segment routing, examples of which are now described with respect to FIG. 3.

Figure 3:
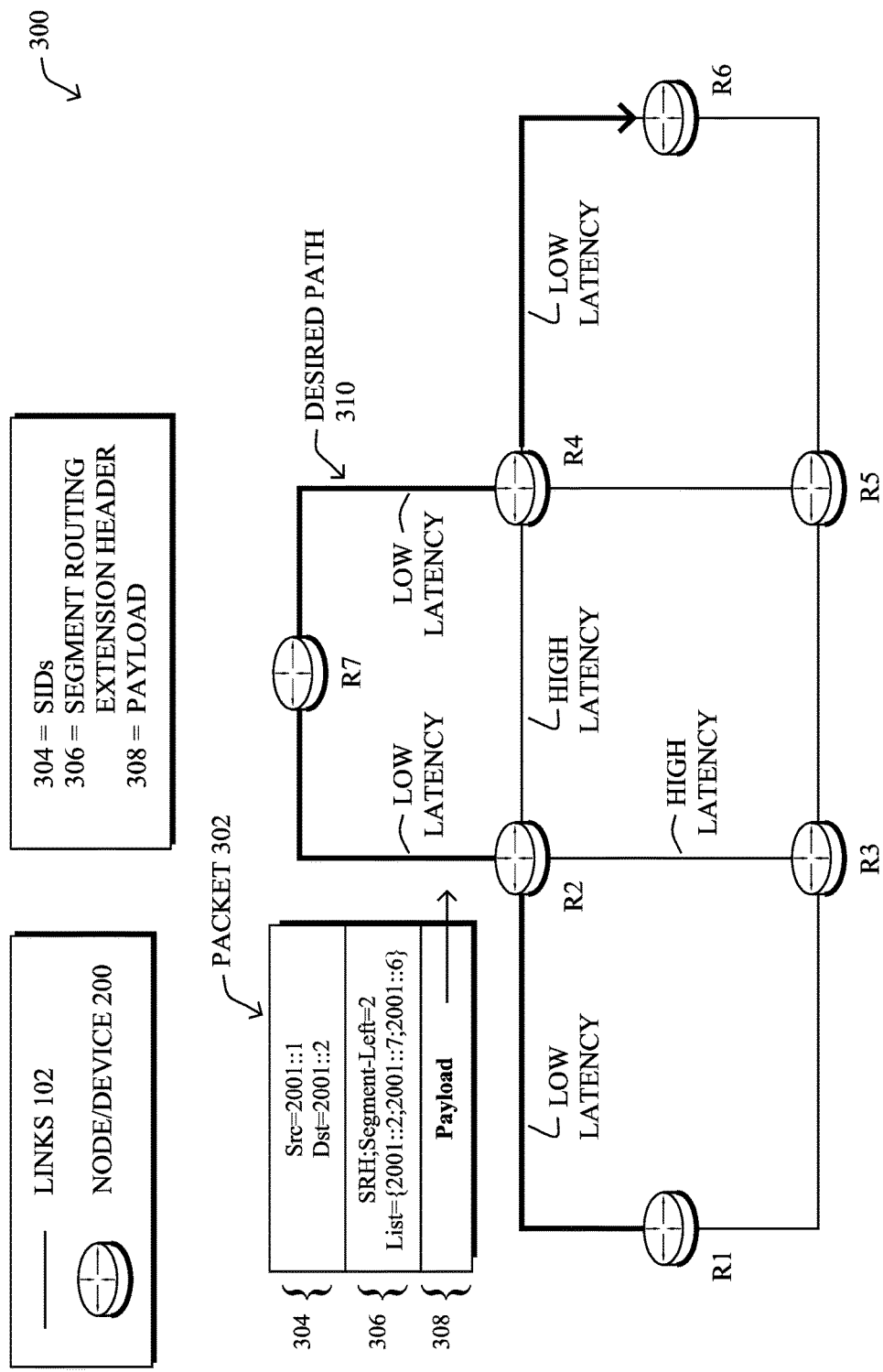
FIG. 3 illustrates an example of segment routing a packet in a network.

As shown in FIG. 3, assume that a network portion 300 of a network (e.g., core network 104) includes a set of nodes/devices 200 that are interconnected via links 102. For example, network portion 300 may include a set of interconnected routers R1-R7 or other devices/nodes. For purposes of illustration, assume that router R1 is to send a packet 302 to router R6 via a desired path 310 using segment routing. Path 310 may comprise a set of links 102 between R1-R2, R2-R7, R7-R4, and R4-R6, that each exhibit low latency when compared to links between R2-R3 and R2-R4 that exhibit high latency. This may be the case, e.g., if packet 302 comprises voice or video data that is particularly sensitive to latency.

To represent the various segments in network portion 300, prefix SIDs may be of the form 2001::x for router Rx and an adjacency segment between routers Rx and Ry may be of the form 2003::xy::x. For example, the prefix SID for R1 may be 2001::1 and the adjacency SID for R1-R2 may be 2003:12:1. In turn, R1 may generate and append a segment routing extension header (SRH) 306 to payload 308 of packet 302 that includes the following SIDs:

2001::2—the prefix SID of the node segment to R2;
2001::7—the prefix SID of the node segment to R7; and
2001::6—the prefix SID of the node segment to R6.

By using the above SIDs in SRH 306, the ingress router, R1, may control the path in network portion 300 along the desired path 310 that includes only low latency links 102. In turn, R1 may send packet 302 towards R2 with the source (Src) and destination (Dst) SIDs 304 set to be 2001::1, the SID of R1, and 2001::2, the SID of R2, respectively.

In many scenarios, however, there is no guarantee that packet 302 will actually be sent via desired path 310. This may be due, for example, to bugs, misconfigurations, race conditions, and the like. Notably, any of the following scenarios may cause R2 to send packet 302 directly to R4 over their shared high latency link 102:

On receiving packet 302, R2 misreads the Segment-left field of SRH 306 as '1' Cinstead of '2.' In other words, R2 may misinterpret SRH 306 to send packet 302 from R2→R6 instead of R2→R7→R6.

R2 rewrites the destination as SID 2001::6, thereby skipping SID 2001::7.

R2 experiences a bug in its Forwarding Information Base (FIB) or experiences a timing consideration that causes R2 to forward packet 302 over its high latency link 102 with R4.

Regardless of the reason for doing so, R2 sending packet 302 directly towards R4 over their high latency link 102 instead of via the low latency links associated with R7 may preserve connectivity (e.g., packet 302 actually reaches its final destination), but lead to a loss of quality from the standpoint of an end user. For example, if packet 302 is part of a voice or video stream, the additional latency attributable to traversing link 102 between R2-R4 may cause the user to perceive a loss of audio or video quality (e.g., the video displayed to the user freezes, etc.). In such a case, it may be very difficult, if not impossible, to troubleshoot or debug any loss of quality reported by the user. Notably, there is no mechanism in segment routing to ensure that a packet sent using segment routing will actually traverse its intended path in the network.

Full-Path Validation in Segment Routing

The techniques herein introduce a mechanism that can operate in conjunction with segment routing to validate that network traffic sent using segment routing was actually sent via its intended network path. In some aspects, the techniques herein introduce customizations to a segment routing extension header (SRH) (e.g., as in the case of an IPv6 dataplane, etc.) for a packet that can be used by nodes along a path in the network to verify that the packet was sent via the intended path and, if not, notify the sender of the packet, accordingly.

Specifically, according to one or more embodiments of the disclosure as described in detail below, a device in a network identifies a packet to be sent to a destination in the network via a path using segment routing. The device determines a list of one or more unique identifiers for one or more of the nodes along the path. The device includes a segment routing header with the packet, the segment routing header comprising a set of segment identifiers and the list of one or more unique identifiers. The device sends the packet with the segment routing header towards the destination in the network. One or more receiving nodes that receive the packet use the set of segment identifiers to route the packet towards the destination and the list of one or more unique identifiers to notify the device when the packet was not sent to the destination via the path.

Illustratively, the techniques described herein may be performed by hardware, software, and/or firmware, such as in accordance with the path validation process 248, which may include computer executable instructions executed by the processor 220 (or independent processor of interfaces 210) to perform functions relating to the techniques described herein, e.g., in conjunction with routing process 244.

Operationally, the techniques herein allow for end-to-end path validations to be performed within segment routing. In particular, the techniques herein propose carrying information within the SRH of a packet, to signify to a processing node between a source and destination to notify the source when the packet is not sent via its intended network path. A similar approach can be taken in the case of MPLS-based networks by carrying this information in packet metadata.

Figure 4C:
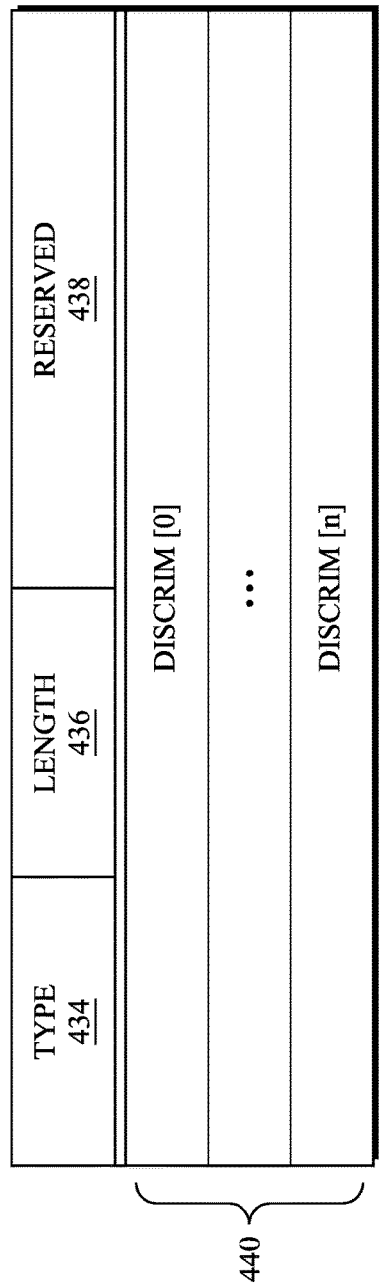

FIGS. 4A-4C illustrate examples of a segment routing header, according to various embodiments herein. As shown in FIG. 4A, SRH 306 mentioned previously may include a number of fields that can be used to segment route packet 302 through the network portion 300 shown in FIG. 3. Such header fields may include, for example, the following:

Next Header field 402: this is an 8-bit selector that identifies the type of packet header of the packet (e.g., packet 302) that immediately follows SRH 306.

Hdr Ext Len field 404: this is an 8-bit unsigned integer that specifies the length of SRH 306 in 8-octet units, not including the first 8 octets.

Routing Type field 406: this field identifies the routing type, as assigned by the to be assigned by the Internet Assigned Numbers Authority (IANA).

Segments Left field 408. this includes the index, in the segment list 416, of the next segment to inspect. At each segment, this field is decremented.

Last Entry field 410: this field includes the index, in segment list 416, of the last entry in segment list 416.

Flags 412: 16 bits of flags.

Tag field 414: this field allows packets having the same properties to be tagged as part of the same group or class.

Segment List 416: this list includes the set of addresses (e.g., IPv6 addresses, etc.) that represent the segments for the intended path. This list is encoded starting with the last segment of the path (e.g., index [0] is the last segment of the intended path and index[n] is the first segment of the intended path). Segments left field 408 index is used in conjunction with segment list 416 to indicate the currently active segment.

Optional Type-Length-Value (TLV) Objects 418: these TLV objects can be used by the destination address, such as additional information about the source device.

FIG. 4B illustrates flags 412 of SRH 306 in greater detail. As shown, flags 412 may include the following:

U flag 420: this is an unused flag that must be ignored on receipt.

P flag 422: this is a protected flag that is set when packet 302 has been rerouted through a fast re-route (FRR) mechanism.

O flag 424: this is an operations and management (OAM) flag that indicates that packet 302 is an OAM packet.

A flag 426: this is an alert flag that indicates that important TLV objects 418 are present.

H flag 428: this flag indicates that a hash message authentication code (HMAC) TLV is present and encoded as the last TLV object 418 of SRH 306.

Unused 432: this is reserved for future use and will be ignored on receipt.

According to various embodiments herein, a new 'B' flag 430 is proposed that signifies to a receiver of packet 300 that notifications are requested regarding validation of the path traversed by packet 300 (e.g., whether packet 300 was actually sent via the intended path). Notably, B flag 430 may indicate that a new TLV is included in TLV objects 418 that can be used by a receiving node to determine whether the packet is actually traversing its intended path in the network. FIG. 4C illustrates an example of such a TLV object 418.

In various embodiments, SRH 306 may include a list 440 of one or more unique identifiers for one or more of the nodes along the intended network path as part of TLV object 418. Generally, TLV object 418 may include its type 434, its length 436, a reserved field 438, and its value (e.g., list 440). For example, in some embodiments, these unique identifies may be bidirectional forwarding detection (BFD) discriminators, such as seamless (S-BFD) discriminators. In general, BFD is an example of a connectivity verification protocol that can be used in a network to ensure connectivity between nodes. As would be appreciated, the unique identifiers in TLV object 418 may be in accordance with other such protocols and the use of BFD herein is for illustrative purposes only. The unique identifiers in list 440 may also be ordered in the same order as the segments in segment list 416 of SRH 306.

During operation, the node processing the packet, which may be an SFC service, may first look to the B flag to determine that it should perform path validation of the service routed packet. In turn, the node may use the segments left field 408 to identify the current discriminator from list 440. Using this unique identifier, the device can then verify whether the packet is properly being sent via its intended path or whether a path deviation has occurred. In turn, the node may send a notification back to the source/sender of the packet, informing this device of the actual path being traversed by the packet. Two possible types of validation are also possible, using the proposed customizations to the SRH of a packet: 1.) prefix SID checks and 2.) adjacency SID checks.

Figure 5A:
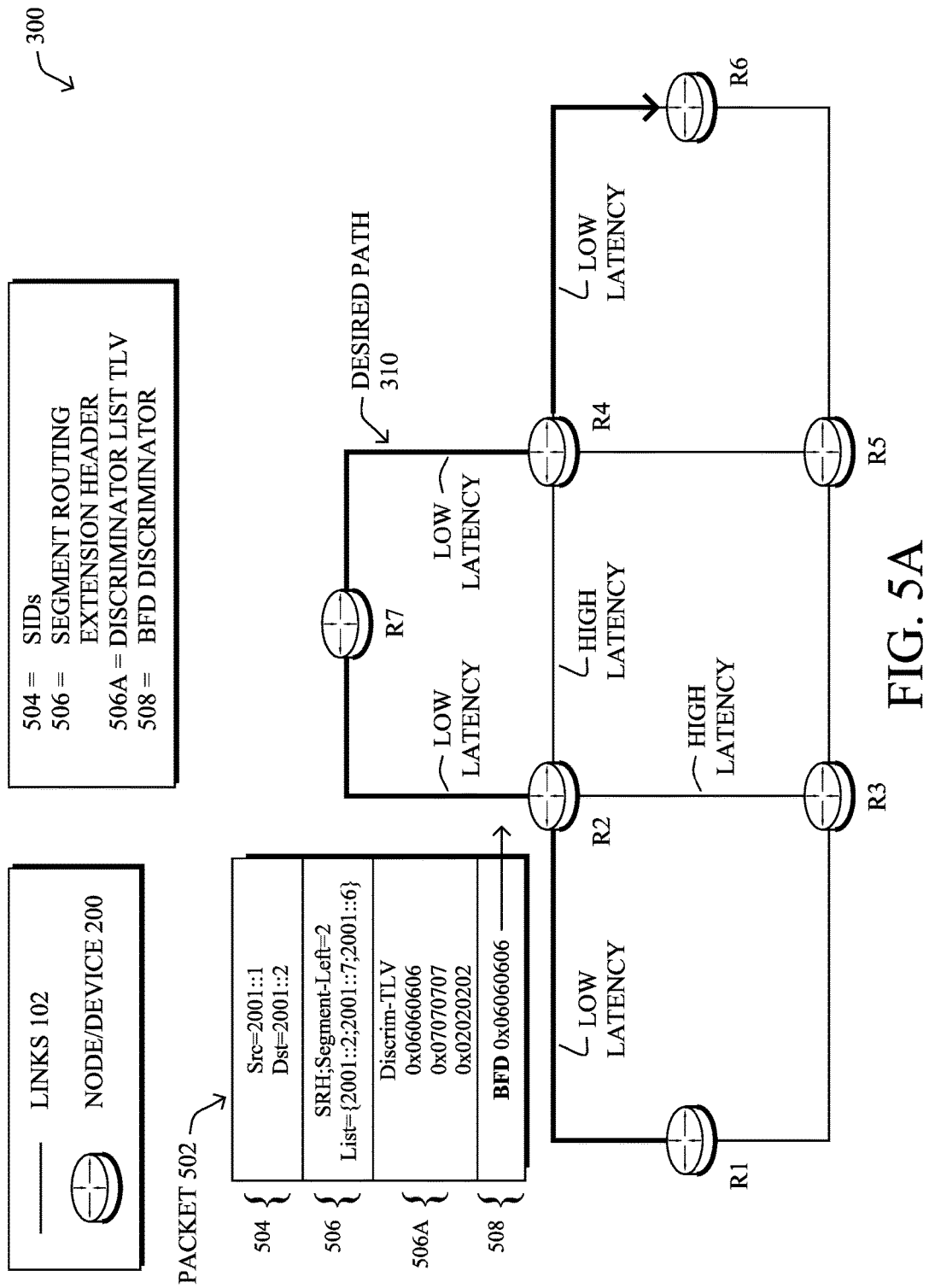
FIGS. 5A-5C illustrate examples of validating a path of a segment routed packet.
Figure 5B:
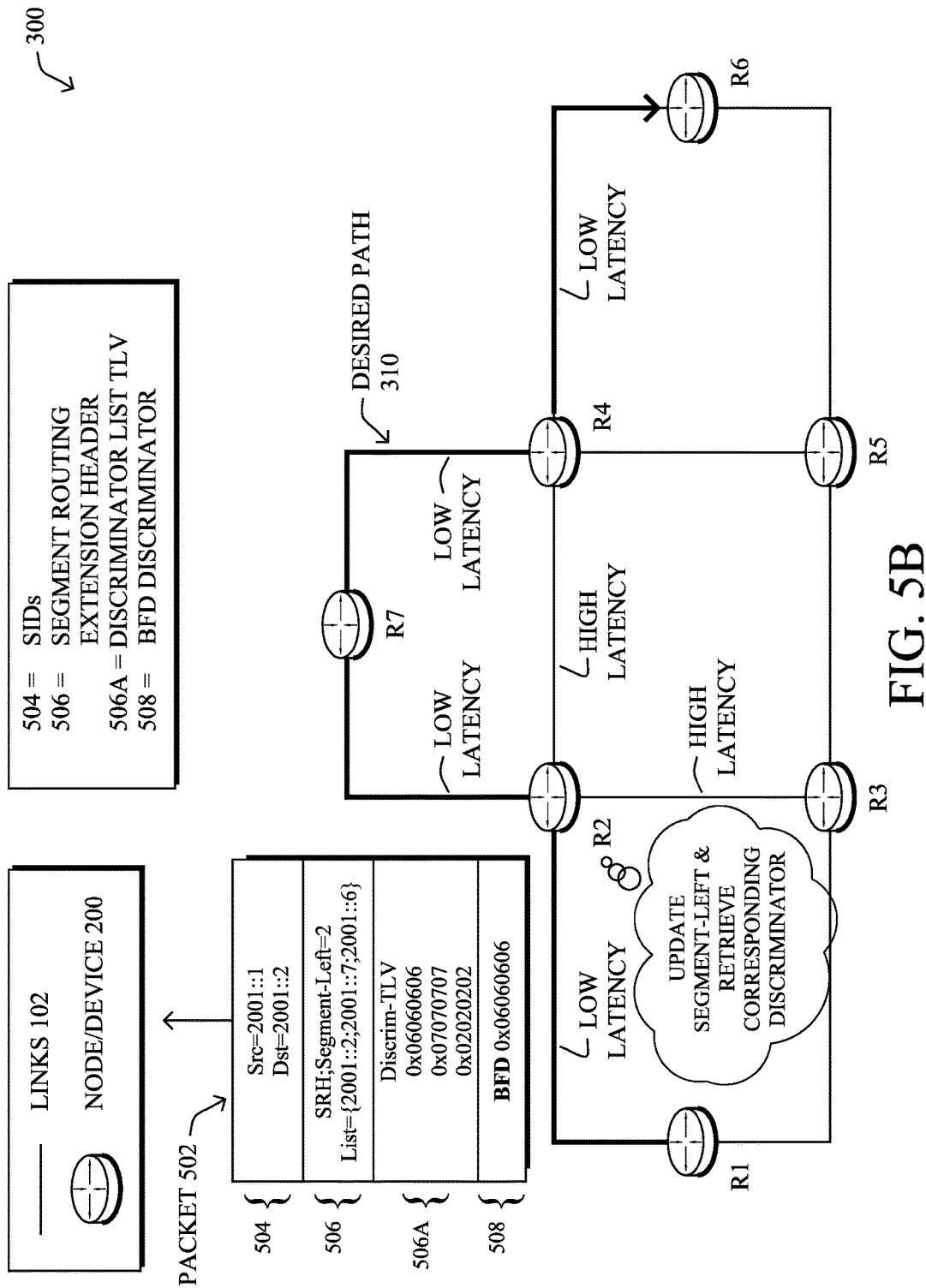
Figure 5C:
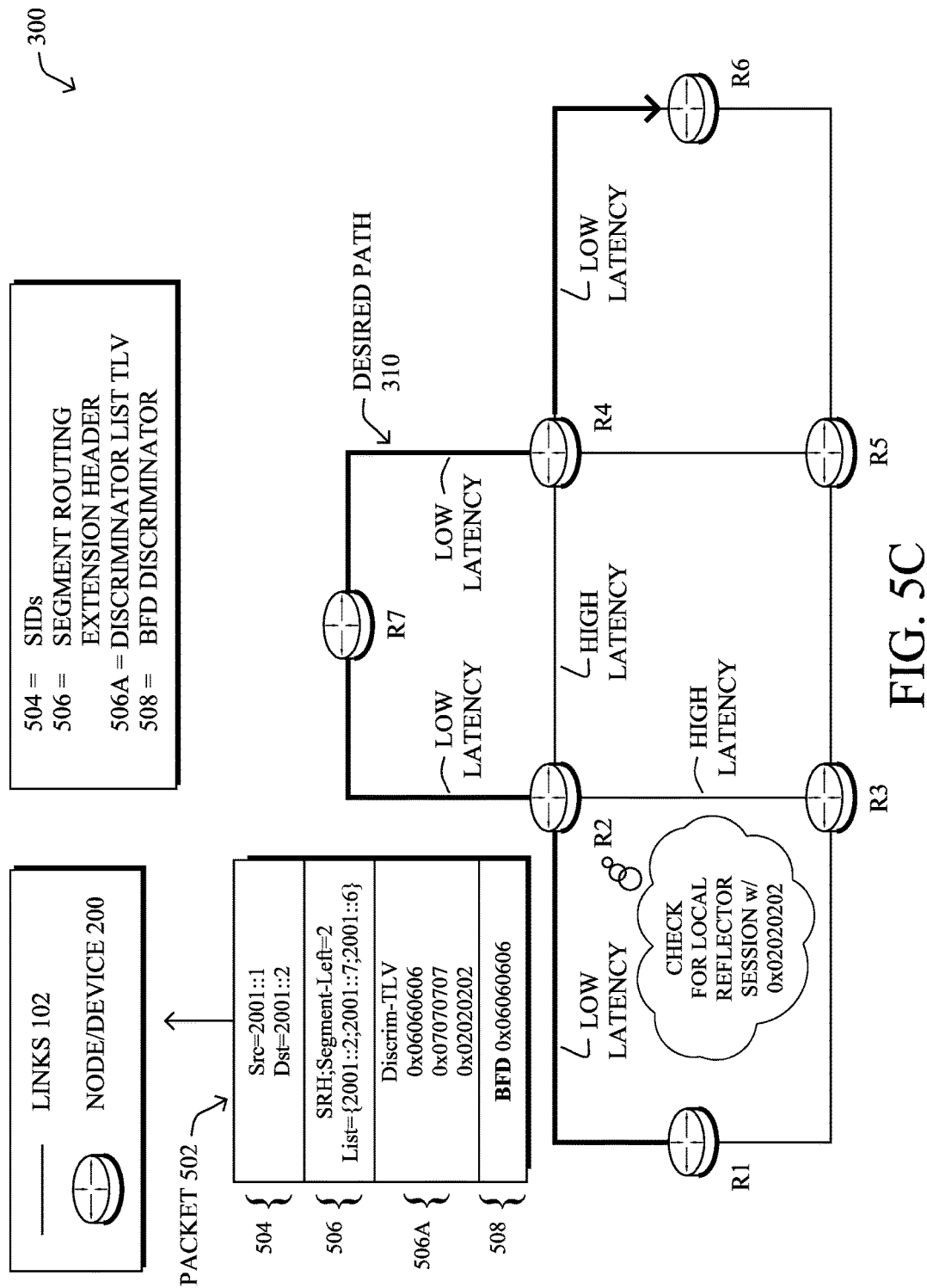

FIGS. 5A-5C illustrate examples of validating a path of a segment routed packet, according to various embodiments. In particular, FIGS. 5A-5C illustrate the case of prefix SID checks being performed, to notify the sender when a path deviation has occurred. As shown in FIG. 5A, assume again that R1 is to send a packet 502 to R6 via the desired path 310 that traverses R7, due to its low latency links. To ensure that packet 502 actually traverses path 310, R1 may set source and destination SIDs 504 for R1 and R2, accordingly, and generate an SRH 506 that includes a discriminator list TLV 506a and a BFD discriminator 508 for processing by R6.

For purposes of illustration, assume that the discriminator for any given node is of the form 0x0x0x0x for node Rx. R1 may perform the following with respect to packet 502:

1. Set "My Discriminator" as local random value.
2. Set "Your Discriminator" as the discriminator of the last segment node.
3. Insert SRH 506 into packet 502 and set the B flag.
4. Include a new TLV (Discrim-TLV) 506a in SRH 506 with the discriminator of each segment ID in the segment list of SRH 506.

Regarding the last step above, note that SRH 506 includes prefix SIDs for R2, R7, and R6. Similarly, discriminator TLV list 506 may include discriminators for R2, R7, and R6, either in the same order as the prefix SIDs or in reverse order. Once constructed, R1 may then send packet 502 on towards R2.

As shown in FIG. 5B, a node processing packet 502, such as R2, may perform any or all of the following:

1.) Check the B flag of SRH 506 to determine whether path validation is needed.
2.) If the B flag is set, use the segment left field of SRH 506 to identify the current discriminator in list 506a. For example, in the case of R2 and a segment-left field of '2,' the current discriminator will be 0x02020202 (e.g., the discriminator index in list 506a can be a function of the segment-left field).
3.) The node may then compare the identified discriminator from list 506a with its own local BFD value or other identifier. For example, as shown in FIG. 5C, R2 may compare the current discriminator identified from list 506a to its own discriminator. If there is a match, this means that packet 502 has successfully reached a node along its intended path 310. However, if the discriminator in SRH 506 differs from that of the local discriminator, this signifies that the packet is deviating from its intended path 310.
4.) The node may send a notification back to the initiator, R1, indicative of its findings regarding the path validation. For example, in some embodiments, R2 may send an S-BFD message back to R1, with potentially an error code, to notify R1 as to the path validation.

Various cases exist with respect to notifying R1 as to the path validation result. In one embodiment, any or all nodes associated with the intended path may send notifications back to R1 (e.g., one notification response per SID) indicative of the path validation result. In further embodiments, a node may only reply back when the node determines that the path of the packet has deviated from that of the intended path.

When the destination, R6, receives packet 502, it may ignore SRH 506, since the segment left field will be '0' at this point. In turn, R6 may look to the next header field, which may point to the S-BFD field 508 associated with a UDP port. In turn, it may look to the "My Discriminator" and "Your Discriminator" values in the BFD payload and reply to the initiator, R1, accordingly.

In the case of a failure scenario, e.g., when packet 502 does not traverse path 310, R1 may trigger any number of corrective measures to be taken. For example, if nodes R2 and R6 notify R1 of their reception of packet 502, but R7 does not, this could indicate to R1 that a failure has occurred in the intended path. In turn, R1 may trigger an FRR action or other mitigation action to be taken.

Figure 6A:
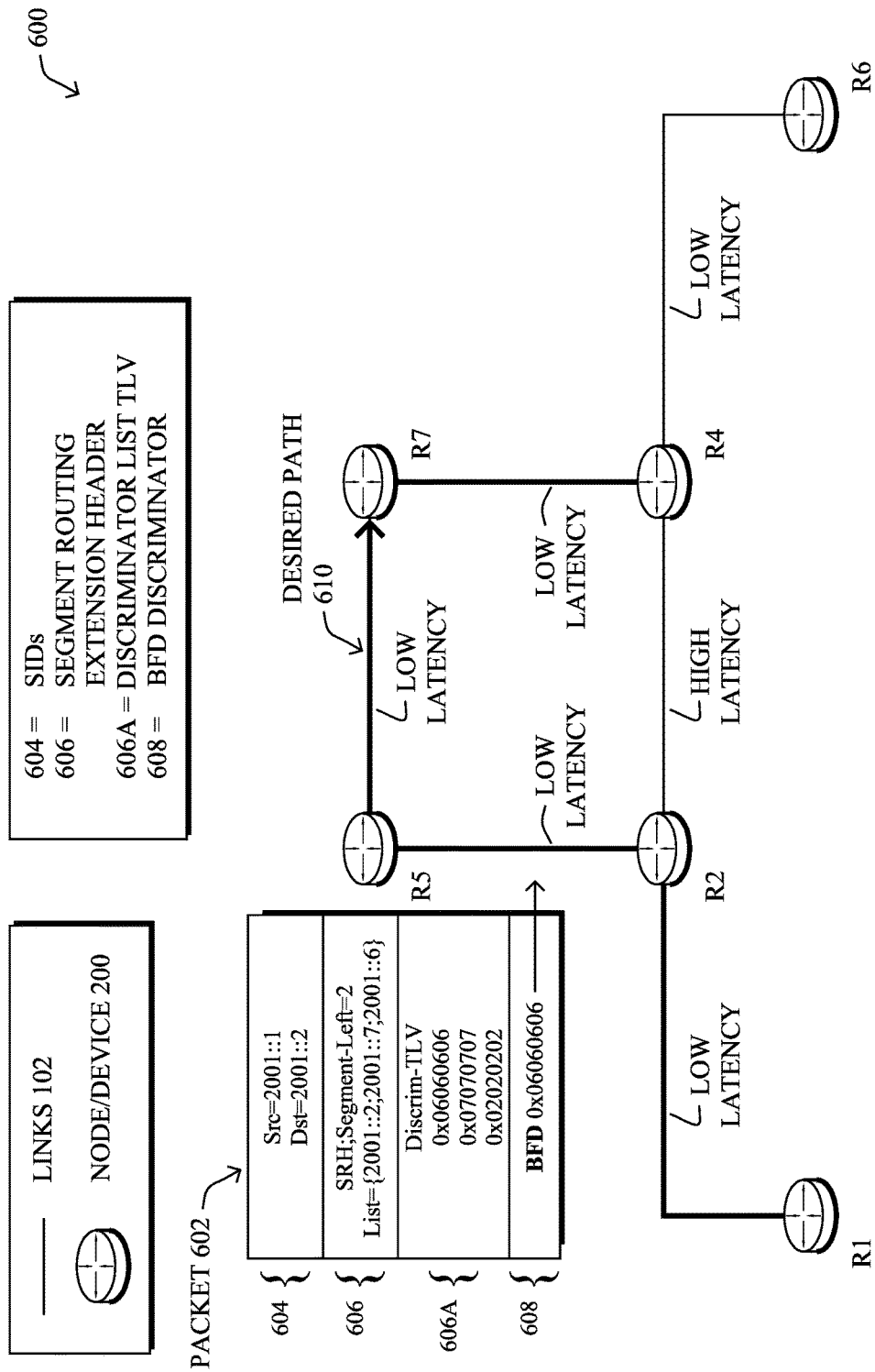
FIGS. 6A-6C illustrate examples of validating a path of a segment routed packet using an adjacency segment.
Figure 6B:
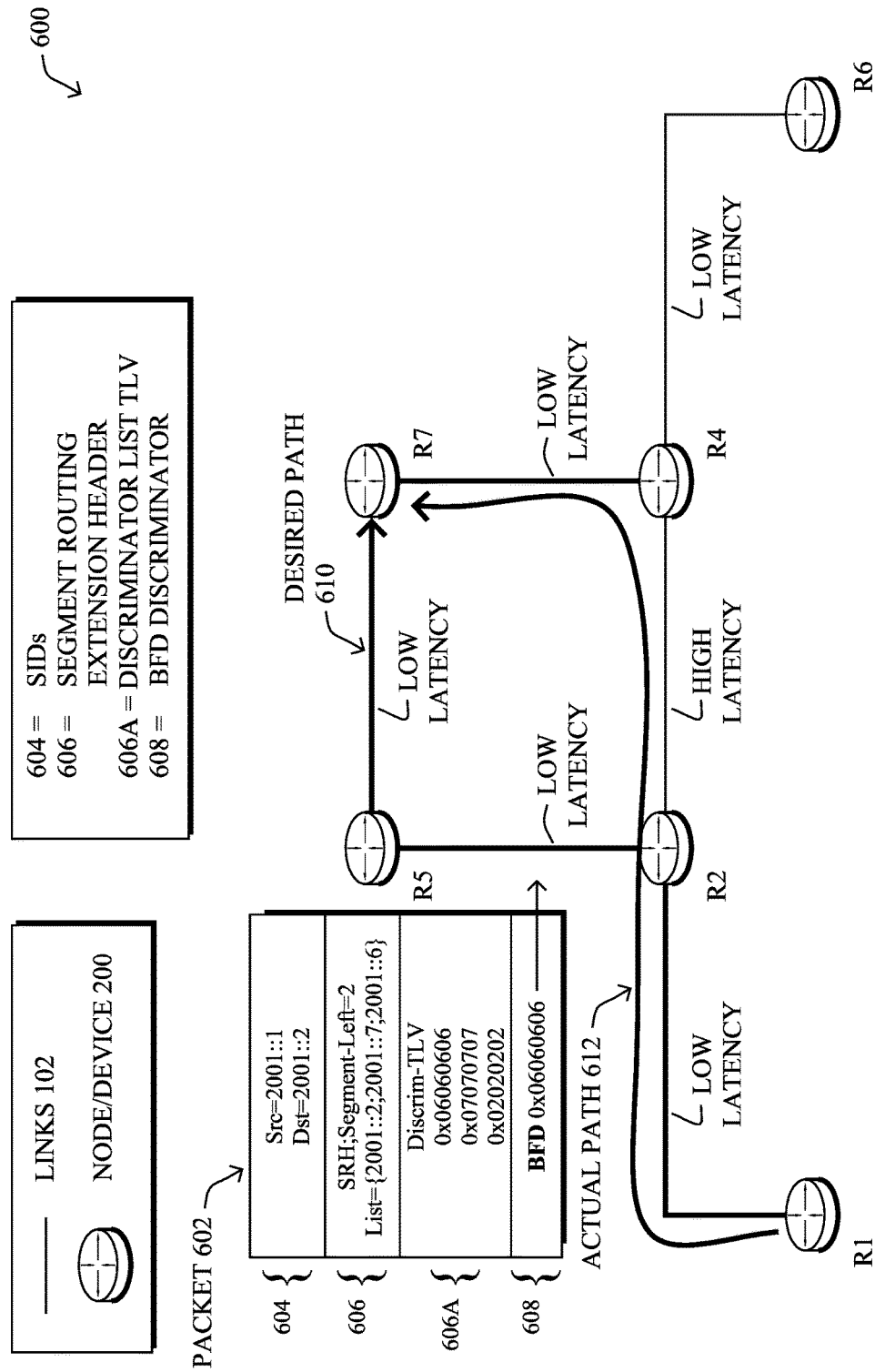
Figure 6C:
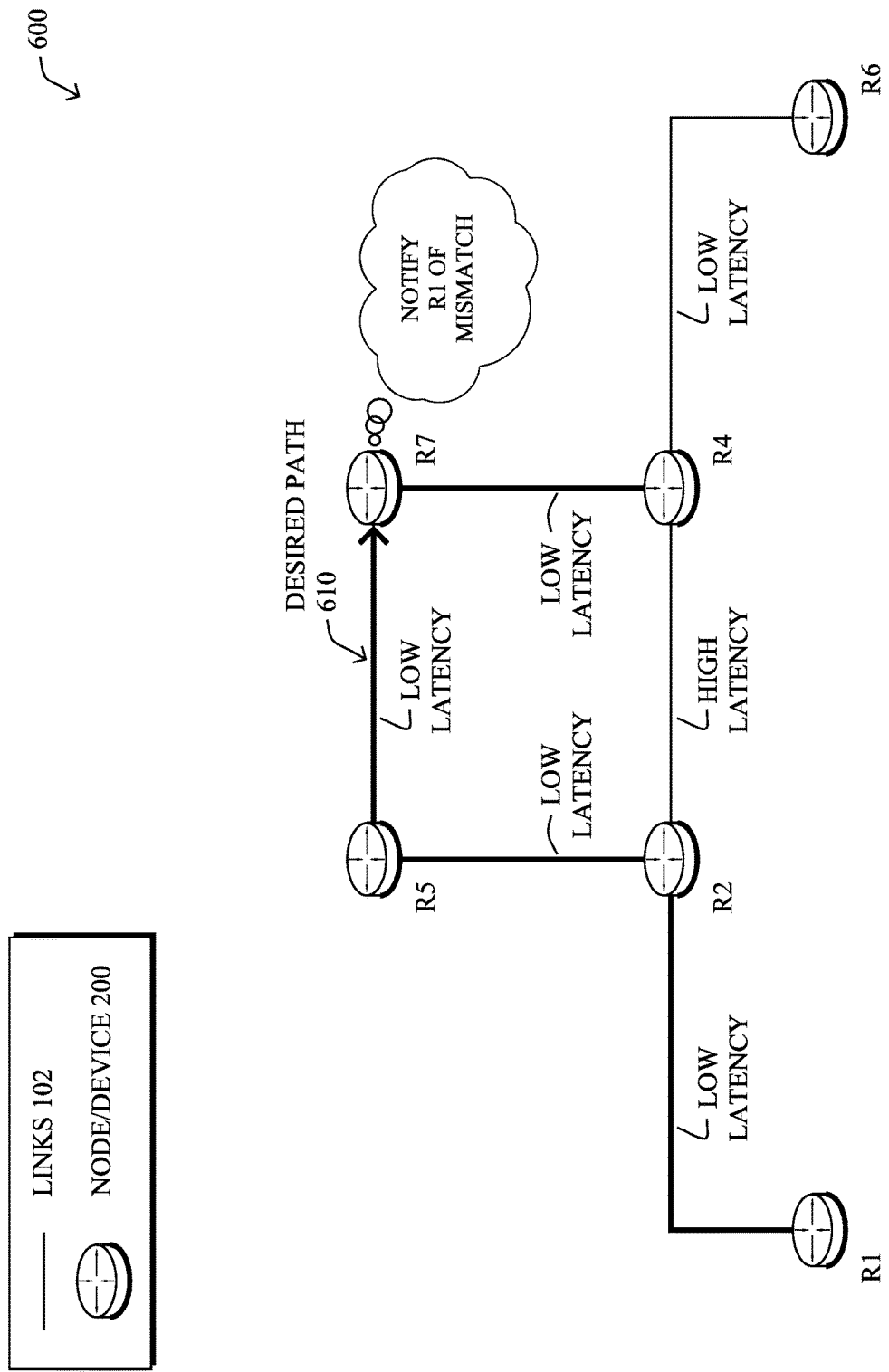

FIGS. 6A-6C illustrate examples of validating a path of a segment routed packet using an adjacency segment, according to various embodiments. As noted, the techniques herein can also be used to perform adjacency SID checks. In FIG. 6A, consider the network portion 600 in which R1 is to send packet 602 to R7 via the desired path 610 which comprises R2→R5→R7, each having a low latency link 102. In other words, path 610 is preferred from a latency perspective over the path that includes R2→R4→R7, as the link 102 between R2 and R4 is a high latency link.

Assume for purposes of illustration that an adjacency SID between nodes Rx-Ry is of the form 2003:xy::x. For example, the adjacency segment between R1-R2 may be represented as 2003:12::1. Accordingly, source and destination SIDs 604 of packet 602 may be 2001::1 to signify the source R1-R2 adjacency segment and 2003::57::7 to signify the R5-R7 destination adjacency segment.

Similar to the case of prefix SID validation, R1 may perform the following with respect to packet 602:

1. Set "My Discriminator" as local random value.
2. Set "Your Discriminator" as the discriminator of the last segment node.
3. Insert SRH 606 into packet 602 and set the B flag.
4. Include a new TLV (Discrim-TLV) 606a in SRH 606 with the discriminator of each adjacency segment ID in SRH segment list.

When a segment routing node receives packet 602, it may perform any or all of the following:

1.) Check the B flag of SRH 606 to determine whether path validation is needed.
2.) If the B flag is set and DA=Adj.SID, check if it matches the incoming interface.
  a. If it does not match, send an error notification to R1.
3.) If the B flag is set, use the segment left field of SRH 606 to identify the current discriminator in list 606a.
4.) If the current discriminator matches the local discriminator of the node, forward the packet.
5.) The node may send a notification back to the initiator, R1, indicative of its findings regarding the path validation. For example, in some embodiments, R2 may send an S-BFD message back to R1, with potentially an error code, to notify R1 as to the path validation.

For example, as shown in FIG. 6B, assume that packet 602 is sent via actual path 612 instead of the desired path 610, for whatever reason. In such a case, R2 may misforward packet 602 over its link 102 with R4 instead of its link 102 with R5. When R7 receives packet 602, the destination address (DA) of packet 602 will be the adjacency SID 2003::57:7 representing the link between R5-R7. If the B flag is set, R7 may compare this adjacency SID to the interface via which it actually received packet 602 (e.g., the interface with R4). Based on this discrepancy, R7 may notify R1 that packet 602 was not sent via the desired path 610, such as by sending a BFD DIAG code to R1.

As a further approach to validating an adjacency SID, each segment routing node may assign a locally unique discriminator for each prefix and adjacency SID. The initiator may then include the relevant discriminators in the SRH of the sent packet. In turn, a receiving node can use the discriminator to determine whether the packet was received via the correct interface, if the discriminator is associated with an adjacency SID. However, if the discriminator is associated with a prefix SID, no such check of the incoming interface is needed.

As noted previously, the techniques herein are also equally applicable to SFC environments. In these implementations, the nodes may be network service functions (SFs) as part of an SFC and may be assigned unique identifiers, such as discriminators. In turn, the nodes/services may use the list of unique SF discriminators in the discriminator TLV of the packet to validate the path traversed by the packet.

As another embodiment, in-band S-BFD can be used with out-of-band S-BFD responses from each transit segment routing node. This could also be used along with actual data traffic where the discriminator list TLV is included in the SRH of the data traffic.

Figure 7:
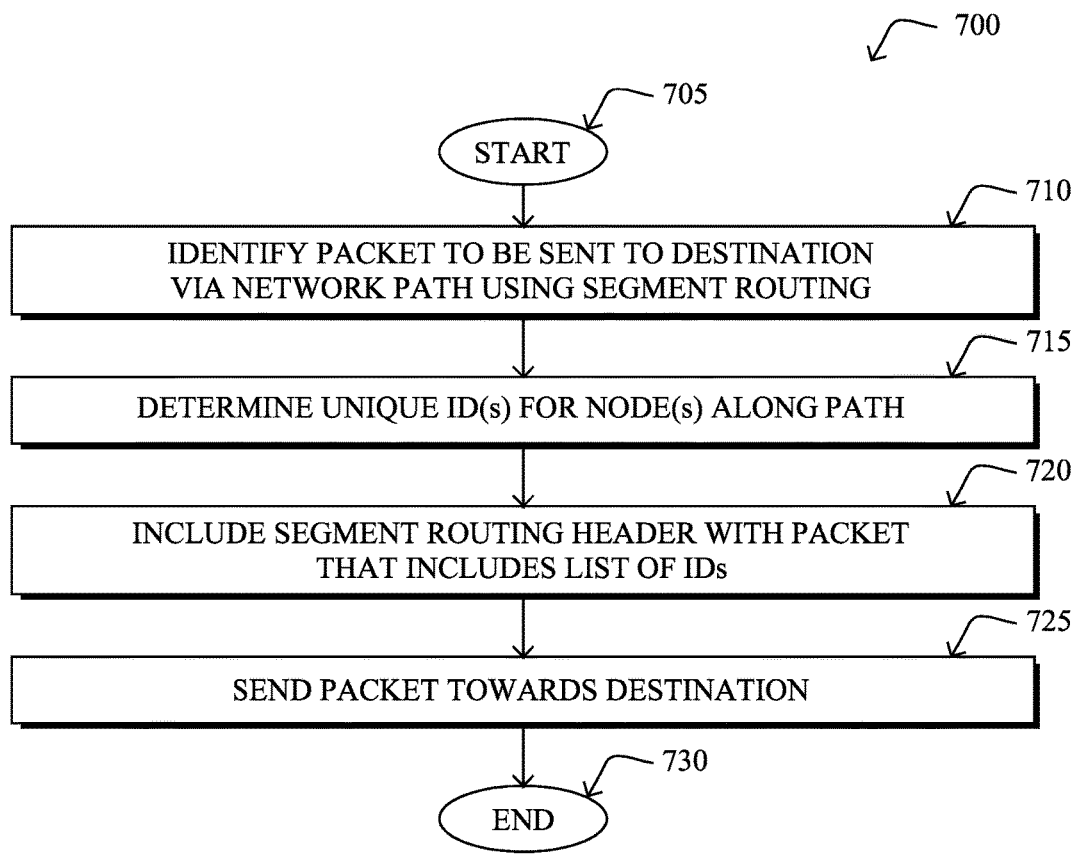
FIG. 7 illustrates an example simplified procedure for sending a segment routed packet to validate a path.

FIG. 7 illustrates an example simplified procedure for sending a segment routed packet to validate a path in a network, in accordance with one or more embodiments described herein. For example, a non-generic, specifically configured device (e.g., device 200) may perform procedure 700 by executing stored instructions (e.g., process 248 and/or process 244). The procedure 700 may start at step 705, and continues to step 710, where, as described in greater detail above, the device may identify a packet to be sent to a destination in the network via a particular path and using segment routing. For example, such a path may have certain characteristics (e.g., latency, jitter, packet drops, other metrics, etc.) that make the path more desirable for the packet than others. Such a path may include any number of nodes, such as router or other networking devices or, if SFC is implemented, SFs along an SFC.

At step 715, as detailed above, the device may determine a list of one or more unique identifiers for one or more of the nodes along the path. In general, such unique identifiers may be configured to be used by a receiving node to determine whether a segment routed packet was sent via the path from step 710. For example, a receiving node may be configured to compare such an identifier to an SID, to determine whether the packet was correctly sent via the intended path for the packet. In some embodiments, the unique identifier(s) may be BFD discriminators that can be compared to the local values of the receiving node, to determine whether the packet was sent to the intended node.

At step 720, the device may include a segment routing header (e.g., an SRH) with the packet identified in step 710, as described in greater detail above. Such a header may include a set of SIDs, as well as the list of one or more unique identifiers determined in step 715. For example, the header may include the list of SIDs to be used for purposes of segment routing the packet, as well as a custom TLV that carries the list of one or more unique identifiers for the nodes located along the intended path for the packet. In some embodiments, the header may also include a custom flag that specifies to a receiving node that a path validation should be performed (e.g., by determining whether the packet was sent via the intended path).

At step 725, as detailed above, the device may send the packet with the segment routing header towards the destination in the network. In turn, one or more receiving nodes that receive the packet may use the set of segment identifiers to route the packet towards the destination and the list of one or more unique identifiers to notify the device when the packet was not sent to the destination via the path. Procedure 700 then ends at step 730.

Figure 8:
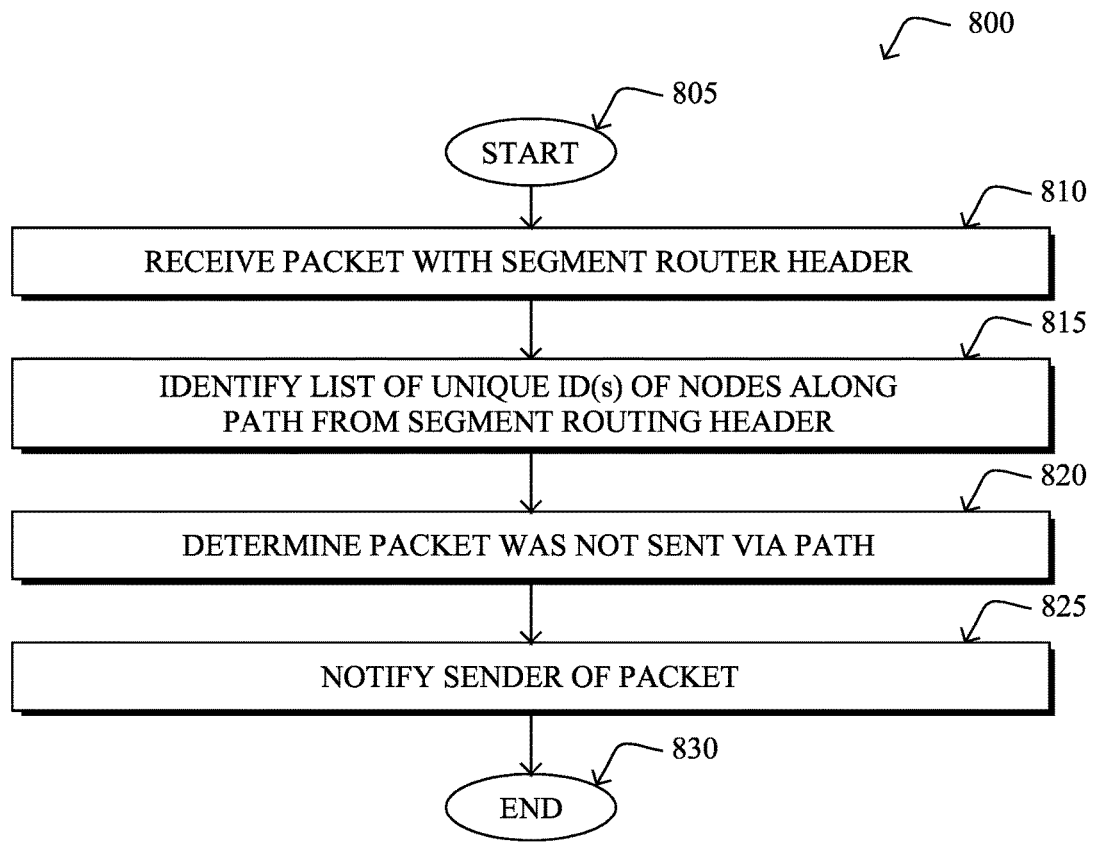
FIG. 8 illustrates an example simplified procedure for processing a segment routed packet to validate a path.

FIG. 8 illustrates an example simplified procedure for processing a segment routed packet to validate a path, in accordance with one or more embodiments described herein. For example, a non-generic, specifically configured device (e.g., device 200) may perform procedure 800 by executing stored instructions (e.g., process 248 and/or process 244). The procedure 800 may start at step 805, and continues to step 810, where, as described in greater detail above, the node may receive a packet that includes a segment routing header that comprises a set of segment identifiers and a list of one or more unique identifiers for one or more nodes along a path from a sender of the packet to a destination in the network. In various embodiments, the receiving node may comprise a service function (SF) as part of a service function chain (SFC).

At step 815, as detailed above, the node may identify the list of one or more unique identifiers from the segment routing header of the packet. Such a list may, as described above, be a list of BFG discriminators or any other form of OAM identifier that represents the intended path to be traversed by the packet. For example, such a path may have certain characteristics that are desired for the type of traffic (e.g., in terms of latency, packet drops, jitter, etc.).

At step 820, the node may determine that the packet was not sent to the destination via the path, as described in greater detail above. In particular, based in part on the identified list of one or more unique identifiers from the segment routing header of the packet, the node may determine that the packet has deviated from the intended path encoded in the list of unique identifiers. For example, if the identifiers are BFD discriminators, the node may determine whether a particular one of the discriminators (e.g., the current discriminator in the list based on the segment-left field of the SRH of the packet) matches a local discriminator of the node. If there is a mismatch, the node may determine that the packet has deviated from its intended network path. In further embodiments, the node may compare the destination adjacency SID of the packet to the interface from which the node received the packet. In yet another embodiment, the SRH of the packet may also include a flag that signifies to the node that path validation is requested.

At step 825, as detailed above, the node may send a notification to the send of the packet in the network (e.g., the segment routing initiator, an ingress router, etc.), notifying the device that the packet was not sent via the intended path. For example, the node may send a BFD DIAG code back to the initiator, thereby notifying the device that the packet did not traverse its intended path. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, allow for full-path validation of segment routed packets in a network. Any discrepancies can then be reported and used to trigger mitigation actions, such as FRR. In some aspects, the techniques may leverage S-BFD to build a discriminator list TLV for the SRH of a packet (e.g., the discriminators advertised using IGP, etc.). In other words, the techniques herein allow for the discriminators or other node identifiers to be carried directly within a data packet, whereas discriminators today are typically sent via out-of-band probe packets. Further, such probes also include only a single discriminator, whereas the techniques herein allow for the data packet to carry a stack of discriminators in the SRH TLV.

While there have been shown and described illustrative embodiments that provide for path validation in a segment routed network, it is to be understood that various other adaptations and modifications may be made within the spirit and scope of the embodiments herein. For example, while certain protocols are shown, such as BFD, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
identifying, at a device in a network, a packet to be sent to a destination in the network via a path using segment routing;
determining, by the device, a list of one or more unique identifiers for one or more of the nodes along the path;
including, by the device, a segment routing header with the packet, the segment routing header comprising a set of segment identifiers and the list of one or more unique identifiers; and
sending, by the device, the packet with the segment routing header towards the destination in the network, wherein one or more receiving nodes that receive the packet use the set of segment identifiers to route the packet towards the destination and the list of one or more unique identifiers to notify the device when the packet was not sent to the destination via the path, wherein the segment routing header is configured to cause a particular one of the one or more receiving nodes to use a segment left field of the segment routing header to identify a particular identifier from the list and send a notification to the device that the packet was not sent via the path based on a comparison between the particular identifier and a local identifier maintained by the particular node.

2. The method as in claim 1, further comprising:
setting, by the device, a flag in the segment routing header of the packet to request notification when the packet is not sent via the path.

3. The method as in claim 1, wherein the packet is an Internet Protocol packet.

4. The method as in claim 1, wherein the one or more receiving nodes comprise one or more network service functions in a service function chain (SFC).

5. The method as in claim 1, wherein the list of one or more unique identifiers comprises a plurality of Bidirectional Forwarding Detection (BFD) discriminators.

6. The method as in claim 5, further comprising:
receiving, at the device, a notification from a particular one of the one or more receiving nodes that the packet was not sent via the path, wherein the notification comprises a BFD Diagnostic (DIAG) error code.

7. The method as in claim 1, wherein the segment routing header is configured to cause a particular one of the one or more receiving nodes to determine whether the packet was sent via the path by determining whether the packet was received by the particular node via an adjacency segment indicated by the segment routing header.

8. A method comprising:
receiving, at a node in a network, a packet that includes a segment routing header that comprises a set of segment identifiers and a list of one or more unique identifiers for one or more nodes along a path from a sender of the packet to a destination in the network;

identifying, by the node, the list of one or more unique identifiers from the segment routing header of the packet;

determining, by the node, that the packet was not sent via the path based in part on the identified list of one or more unique identifiers from the segment routing header of the packet by comparing a particular identifier from the list of unique identifiers in the segment routing header to a local identifier maintained by the particular node; and notifying, by the node, the sender of the packet in the network that the packet was not sent via the path.

9. The method as in claim 8, wherein the list of one or more unique identifiers comprises a plurality of Bidirectional Forwarding Detection (BFD) discriminators.

10. The method as in claim 9, notifying the sender of the packet in the network that the packet was not sent via the path comprises:

sending, by the node, a notification to the sender of the packet that the packet was not sent via the path to the destination, wherein the notification comprises a BFD Diagnostic (DIAG) error code.

11. The method as in claim 8, wherein determining that the packet was not sent via the path comprises:

determining whether the packet was received by the node via an adjacency segment indicated by the segment routing header.

12. The method as in claim 8, wherein the node comprises a network service function in a service function chain (SFC).

13. An apparatus, comprising:
one or more network interfaces to communicate with a network;
a processor coupled to the network interfaces and configured to execute one or more processes; and
a memory configured to store a process executable by the processor, the process when executed configured to:
identify a packet to be sent to a destination in the network via a path using segment routing;
determine a list of one or more unique identifiers for one or more of the nodes along the path;
include a segment routing header with the packet, the segment routing header comprising a set of segment identifiers and the list of one or more unique identifiers;
send the packet with the segment routing header towards the destination in the network, wherein one or more receiving nodes that receive the packet use the set of segment identifiers to route the packet towards the destination and the list of one or more unique identifiers to notify the device when the packet was not sent to the destination via the path wherein the segment routing header is configured to cause a particular one of the one or more receiving nodes to use a segment left field of the segment routing header to identify a particular identifier from the list and send a notification to the apparatus that the packet was not sent via the path based on a comparison between the particular identifier and a local identifier maintained by the particular node.

14. The apparatus as in claim 13, wherein the process when executed is further configured to:
set a flag in the segment routing header of the packet to request notification from a receiving node when the packet is not sent via the path.

15. The apparatus as in claim 13, wherein the list of one or more unique identifiers comprises a plurality of Bidirectional Forwarding Detection (BFD) discriminators.

16. The apparatus as in claim 15, wherein the process when executed is further configured to:
receive a notification from a particular one of the one or more receiving nodes that the packet was not sent via the path, wherein the notification comprises a BFD Diagnostic (DIAG) error code.

17. The apparatus as in claim 13, wherein the segment routing header is configured to cause a particular one of the one or more receiving nodes to determine whether the packet was sent via the path by determining whether the packet was received by the particular node via an adjacency segment indicated by the segment routing header.

* * * * *

UNITED STATES PATENT AND TRADEMARK OFFICE
CERTIFICATE OF CORRECTION

PATENT NO. : 10,454,822 B2
APPLICATION NO. : 15/661540
DATED : October 22, 2019
INVENTOR(S) : Nagendra Kumar Nainar et al.

Page 1 of 1

It is certified that error appears in the above-identified patent and that said Letters Patent is hereby corrected as shown below:

In the Specification

Column 5, Line 28, should read:
field of SRH 306 as '1' instead of '2.' In other words, In the Claims Column 14, Line 11, should read:
packet was not sent to the destination via the path, Signed and Sealed this
Seventh Day of January, 2020

Andrei Iancu
*Director of the United States Patent and Trademark Office*